United States Patent
Azuma

(10) Patent No.: US 9,348,350 B2
(45) Date of Patent: May 24, 2016

(54) VOLTAGE REGULATOR

(71) Applicant: Seiko Instruments Inc., Chiba-shi, Chiba (JP)

(72) Inventor: Fumimasa Azuma, Phnom Penh (KH)

(73) Assignee: SII SEMICONDUCTOR CORPORATION, Chiba (JP)

(*) Notice: Subject to any disclaimer, the term of this patent is extended or adjusted under 35 U.S.C. 154(b) by 84 days.

(21) Appl. No.: 14/465,327

(22) Filed: Aug. 21, 2014

(65) Prior Publication Data

US 2015/0055257 A1  Feb. 26, 2015

(30) Foreign Application Priority Data

Aug. 26, 2013 (JP) ................. 2013-174842
Jul. 7, 2014 (JP) ................. 2014-139936

(51) Int. Cl.
*H02H 9/02* (2006.01)
*G05F 1/573* (2006.01)

(52) U.S. Cl.
CPC ............ *G05F 1/573* (2013.01); *H02H 9/025* (2013.01)

(58) Field of Classification Search
CPC ................. H02H 9/025; G05F 1/573
USPC .......................................... 361/18
See application file for complete search history.

(56) References Cited

U.S. PATENT DOCUMENTS

| | | | |
|---|---|---|---|
| 6,922,321 B2* | 7/2005 | Katoh | G05F 1/575 361/93.9 |
| 8,547,079 B2 | 10/2013 | Socheat | |
| 2005/0029999 A1* | 2/2005 | Fukui | G05F 1/573 323/285 |
| 2006/0103992 A1* | 5/2006 | Kanakubo | H02H 3/087 361/18 |
| 2009/0206807 A1* | 8/2009 | Imura | G05F 1/573 323/277 |
| 2010/0090664 A1* | 4/2010 | Jian | G05F 1/573 323/277 |
| 2010/0213909 A1* | 8/2010 | Nakashimo | G05F 1/5735 323/282 |
| 2012/0098513 A1* | 4/2012 | Terada | G05F 1/5735 323/284 |
| 2012/0194147 A1* | 8/2012 | Socheat | G05F 1/575 323/265 |

* cited by examiner

*Primary Examiner* — Scott Bauer
(74) *Attorney, Agent, or Firm* — Brinks Gilson & Lione

(57) ABSTRACT

Provided is a voltage regulator including an overcurrent protection circuit in which an output voltage-output current characteristic exhibits an optimal fold-back characteristic even when an overcurrent state is detected. The overcurrent protection circuit includes a control circuit for generating a current in accordance with an output voltage, and controls a gate of an output transistor with use of a current obtained by subtracting the current from a sense current flowing in accordance with an output current.

3 Claims, 6 Drawing Sheets

VOLTAGE REGULATOR

RELATED APPLICATIONS

This application claims priority under 35 U.S.C. §119 to Japanese Patent Application Nos. 2013-174842 filed on Aug. 26, 2013 and 2014-139936 filed on Jul. 7, 2014, the entire contents of which are hereby incorporated by reference.

BACKGROUND OF THE INVENTION

1. Field of the Invention

The present invention relates to an overcurrent protection circuit of a voltage regulator.

2. Description of the Related Art

A related-art voltage regulator is now described. FIG. 3 is a circuit diagram illustrating the related-art voltage regulator.

The related-art voltage regulator includes a reference voltage circuit 111, a differential amplifier circuit 112, an overcurrent protection circuit 130, a PMOS transistor 113, a resistor 114, a resistor 115, a ground terminal 101, a power supply terminal 102, and an output terminal 103. The overcurrent protection circuit 130 includes a PMOS transistor 131, an NMOS transistor 132, a differential amplifier circuit 133, a resistor 134, and a control circuit 140. The control circuit 140 includes a PMOS transistor 141, a differential amplifier circuit 142, and a resistor 143.

The differential amplifier circuit 112 has an inverting input terminal connected to the reference voltage circuit 111, a non-inverting input terminal connected to a node between the resistor 114 and the resistor 115, and an output terminal connected to a gate of the PMOS transistor 113. The PMOS transistor 113 has a source connected to the power supply terminal 102, and a drain connected to the output terminal 103. The resistor 114 and the resistor 115 are connected between the output terminal 103 and the ground terminal 101. The PMOS transistor 131 has a gate connected to the output terminal of the differential amplifier circuit 112, a source connected to the power supply terminal 102, and a drain connected to a drain of the NMOS transistor 132. The differential amplifier circuit 133 has a non-inverting input terminal connected to the non-inverting input terminal of the differential amplifier circuit 112, an inverting input terminal connected to a source of the NMOS transistor 132, and an output terminal connected to a gate of the NMOS transistor 132. The resistor 134 is connected between the source of the NMOS transistor 132 and the ground terminal 101. The differential amplifier circuit 142 has a non-inverting input terminal connected to the reference voltage circuit 111, an inverting input terminal connected to the drain of the NMOS transistor 132, and an output terminal connected to a gate of the PMOS transistor 141. The resistor 143 is connected between the inverting input terminal of the differential amplifier circuit 142 and the ground terminal 101. The PMOS transistor 141 has a drain connected to the output terminal of the differential amplifier circuit 112, and a source connected to the power supply terminal 102. The resistor 114 and the resistor 115 form a dividing circuit which divides an output voltage Vout of the output terminal 103 and outputs a divided voltage Vfb.

The related-art voltage regulator operates as follows to protect a circuit against an overcurrent. In a state in which a predetermined output voltage Vout is output from the output terminal 103, a High voltage is output from the output terminal of the differential amplifier circuit 133, and hence the NMOS transistor 132 is maintained in an ON state.

When the output terminal 103 and the ground terminal 101 are short-circuited, an output current Iout is increased. When an overcurrent state in which the output current Iout exceeds a maximum output current Im is established, a current flowing through the PMOS transistor 131 for sensing an output current is increased, and a voltage of the inverting input terminal of the differential amplifier circuit 142 is thus increased. When the voltage of the inverting input terminal of the differential amplifier circuit 142 exceeds a voltage of the reference voltage circuit 111, a voltage of the output terminal of the differential amplifier circuit 142 is gradually reduced to turn on the PMOS transistor 141 gradually. In this way, a voltage of the gate of the PMOS transistor 113 gradually becomes a voltage of the power supply terminal 102 to turn off the PMOS transistor 113.

When the output terminal 103 and the ground terminal 101 are short-circuited, the output voltage Vout is also dropped and the divided voltage Vfb is thus dropped. When the divided voltage Vfb is dropped, the output voltage of the differential amplifier circuit 133 is gradually reduced to turn off the NMOS transistor 132 gradually. Then, a current flowing through the NMOS transistor 132 is gradually reduced, whereas a current flowing through the resistor 143 is gradually increased. In other words, the drop in output voltage Vout can increase the voltage of the inverting input terminal of the differential amplifier circuit 142. Therefore, the differential amplifier circuit 142 can further turn on the PMOS transistor 141 and further turn off the PMOS transistor 113.

As described above, the related-art voltage regulator can perform overcurrent protection with use of an output voltage-output current characteristic that exhibits a fold-back characteristic.

However, the related art has a problem in that the output voltage-output current characteristic does not draw an optimal fold back line when the overcurrent protection circuit 130 starts to work.

FIG. 4 shows the output voltage-output current characteristic of the related-art voltage regulator. As apparent from FIG. 4, when the overcurrent protection circuit 130 starts to work, there is a time period during which the output voltage Vout is dropped while the maximum output current Im flows. For this reason, the PMOS transistor 113 is damaged in this period.

In order to obtain an optimal fold-back characteristic, it is required that the inverting input terminal of the differential amplifier circuit 133 have a voltage that is substantially equal to the divided voltage Vfb, and the inverting input terminal of the differential amplifier circuit 142 have a voltage that is substantially equal to the reference voltage Vref. However, the conditions are not satisfied when the overcurrent protection circuit 130 starts to work. If the divided voltage Vfb and the reference voltage Vref are substantially equal to each other when the overcurrent protection circuit 130 starts to work, although a current proportional to the reference voltage Vref needs to flow through the resistor 134, the voltage between the drain and the source of the NMOS transistor 132 in this case is substantially zero and no current flows therebetween. There is a problem in that, when the overcurrent protection circuit 130 starts to work, a potential of the source of the NMOS transistor 132, which is determined so that the drain current of the NMOS transistor 132 and a current flowing through the resistor 134 become equal to each other, does not become the divided voltage Vfb.

SUMMARY OF THE INVENTION

The present invention has been made in view of the above-mentioned problem, and provides a voltage regulator including an overcurrent protection circuit in which an output voltage-output current characteristic draws an optimal fold back line even when the overcurrent protection circuit starts to work.

A voltage regulator including an overcurrent protection circuit according to one embodiment of the present invention has the following feature. The voltage regulator includes a first differential amplifier circuit configured to amplify a difference between a reference voltage and a divided voltage obtained by dividing an output voltage output from an output transistor, to thereby control a gate of the output transistor, and an overcurrent protection circuit configured to protect a circuit against an overcurrent of an output current of the output transistor. The overcurrent protection circuit includes a sense transistor configured to sense the output current, a first control circuit configured to generate a current proportional to the output voltage, and a second control circuit configured to control the gate of the output transistor in accordance with a sense current and a current of the first control circuit.

The voltage regulator including the overcurrent protection circuit according to one embodiment of the present invention uses the current proportional to the output current and the current proportional to the output voltage, and thus enables the overcurrent protection with the output voltage-output current characteristic drawing the optimal fold back line even when the output voltage is not dropped in the state in which the difference between the input voltage and the output voltage is small and the output current is large.

DETAILED DESCRIPTION OF THE PREFERRED EMBODIMENTS

First Embodiment

Figure 1:
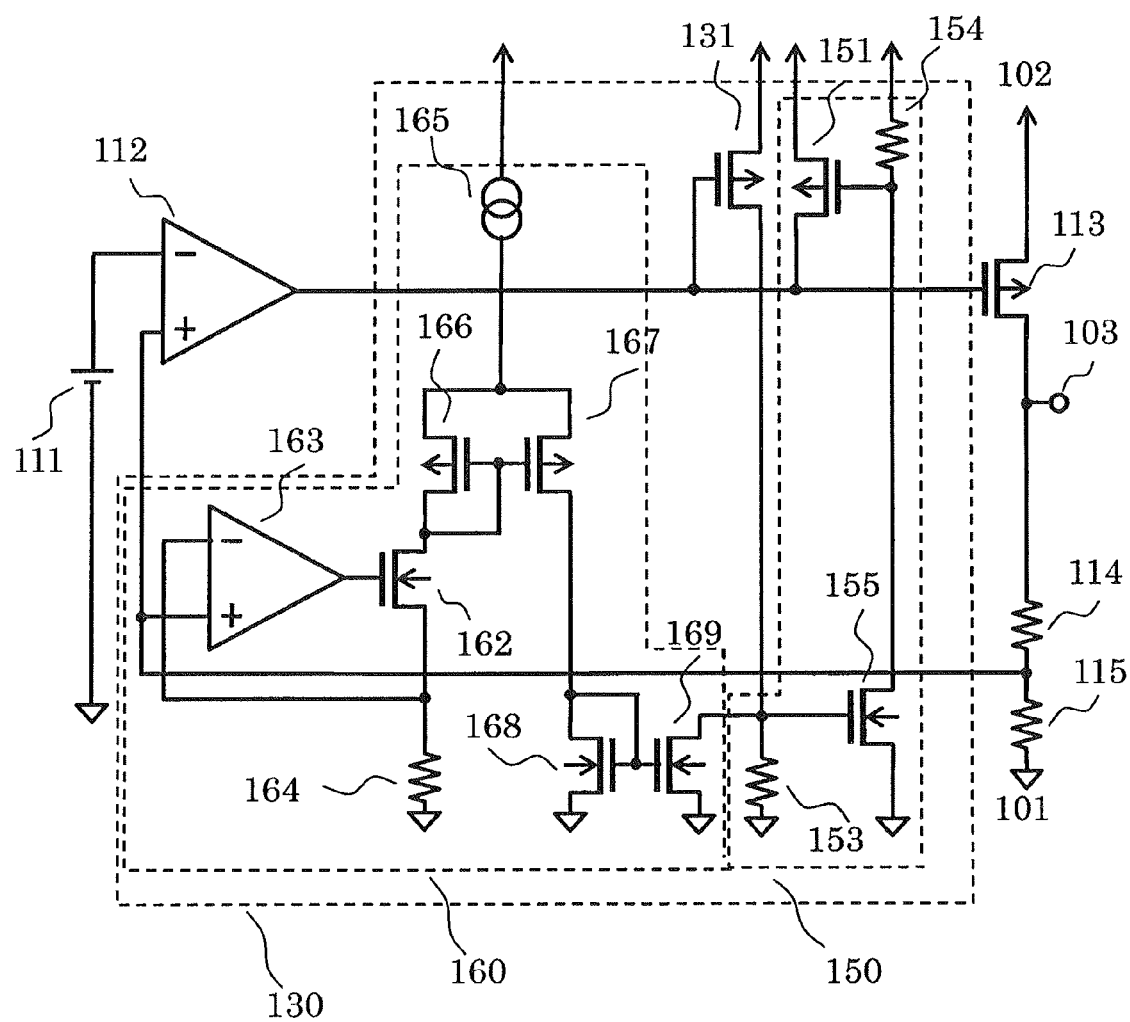
FIG. 1 is a circuit diagram illustrating a voltage regulator according to a first embodiment of the present invention.

A voltage regulator according to a first embodiment of the present invention includes a reference voltage circuit 111, a differential amplifier circuit 112, an overcurrent protection circuit 130, a PMOS transistor 113, a resistor 114, a resistor 115, a ground terminal 101, a power supply terminal 102, and an output terminal 103.

The overcurrent protection circuit 130 includes a PMOS transistor 131 and control circuits 150 and 160.

The control circuit 150 includes a PMOS transistor 151, an NMOS transistor 155, and resistors 153 and 154.

The control circuit 160 includes an NMOS transistor 162, a differential amplifier circuit 163, a resistor 164, a constant current source 165, PMOS transistors 166 and 167, and NMOS transistors 168 and 169.

The differential amplifier circuit 112 has an inverting input terminal connected to the reference voltage circuit 111, a non-inverting input terminal connected to a node between the resistor 114 and the resistor 115, and an output terminal connected to gates of the PMOS transistors 113 and 131. The PMOS transistor 113 has a source connected to the power supply terminal 102, and a drain connected to the output terminal 103. The resistor 114 and the resistor 115 are connected in series between the output terminal 103 and the ground terminal 101. The PMOS transistor 131 has a source connected to the power supply terminal 102, and a drain connected to the resistor 153 and a gate of the NMOS transistor 155. The resistor 114 and the resistor 115 form a dividing circuit which divides an output voltage Vout of the output terminal 103 and outputs a divided voltage Vfb.

The constant current source 165 is connected between the power supply terminal 102 and sources of the PMOS transistors 166 and 167. The PMOS transistor 166 has a gate and a drain that are connected to a drain of the NMOS transistor 162 and a gate of the PMOS transistor 167. The NMOS transistor 162 has a source connected to an inverting input terminal of the differential amplifier circuit 163 and the resistor 164, and a gate connected to an output terminal of the differential amplifier circuit 163. The differential amplifier circuit 163 has a non-inverting input terminal connected to the non-inverting input terminal of the differential amplifier circuit 112. The PMOS transistor 167 has a drain connected to a drain and a gate of the NMOS transistor 168. The NMOS transistor 168 has the gate and the drain, which are connected to a gate of the NMOS transistor 169, and a source connected to the ground terminal 101. The NMOS transistor 169 has a drain connected to a gate of the NMOS transistor 155, and a source connected to the ground terminal 101.

The PMOS transistor 151 has a source connected to the power supply terminal 102, a gate connected to a drain of the NMOS transistor 155, and a drain connected to the gate of the PMOS transistor 113. The resistor 154 is connected between the power supply terminal 102 and the gate of the PMOS transistor 151. The NMOS transistor 155 has a source connected to the ground terminal 101.

Next, an operation of the overcurrent protection circuit 130 of the voltage regulator according to the first embodiment is described.

The differential amplifier circuit 163 controls a voltage of the gate of the NMOS transistor 162 so that the source of the NMOS transistor 162 has a voltage equal to the divided voltage Vfb. A current proportional to the divided voltage Vfb flows through the resistor 164. This current is mirrored by the PMOS transistor 166, the PMOS transistor 167, the NMOS transistor 168, and the NMOS transistor 169.

A sense current in accordance with an output current Iout flowing through the output terminal 103 is caused to flow through the PMOS transistor 131. A current is caused to flow through the resistor 153, which is obtained by subtracting from the sense current flowing through the PMOS transistor 131 a current flowing through the NMOS transistor 169, namely, a current obtained by mirroring the current flowing through the resistor 164.

When the output terminal 103 and the ground terminal 101 are short-circuited, the output current Iout is increased. When an overcurrent state in which the output current Iout exceeds a maximum output current Im is established, the sense current flowing through the PMOS transistor 131 is increased to generate a voltage at the resistor 153. When the voltage of the resistor 153 is increased, the NMOS transistor 155 is turned on to cause a current to flow through the resistor 154, thereby turning on the PMOS transistor 151 gradually. In this way, the voltage of the gate of the PMOS transistor 113 gradually becomes the voltage of the power supply terminal 102 to turn off the PMOS transistor 113 gradually, thereby reducing the output current Iout.

When the PMOS transistor 113 is gradually turned off, the output voltage Vout and the divided voltage Vfb are dropped. When the divided voltage Vfb is dropped, the voltage applied to one terminal of the resistor 164 is reduced and the current flowing through the resistor 164 is thus reduced. Along this, the current flowing through the NMOS transistor 169 is reduced and the current flowing through the resistor 153 is accordingly increased so that the gate of the PMOS transistor 113 is further turned off.

When the overcurrent protection circuit 130 operates, Expressions (1) to (5) are satisfied.

$$Vth(155)=R(153)\times I(153) \tag{1}$$

$$I(131)=Iout\times Mi \tag{2}$$

$$I(153)=I(131)-I(169) \tag{3}$$

$$I(169)=I(164)=Vfb/R(164) \tag{4}$$

$$Vfb=A\times Vout \tag{5}$$

where $Vth(x)$ represents a threshold of an NMOS transistor x, $R(x)$ represents a resistance value of a resistor x, $I(x)$ represents a current flowing through an element x, Mi represents a mirror ratio of the PMOS transistor 131 with respect to the PMOS transistor 113, Vout represents a voltage of the output terminal 103, Iout represents a drain current of the PMOS transistor 113, Vfb represents a divided voltage determined based on the output voltage Vout and resistance values of the resistor 114 and the resistor 115, and A represents a proportionality factor.

Based on Expressions (1) to (5), Expression (6) is satisfied between the output voltage Vout and the output current Iout.

$$Vout=R(164)/A[Mi\times Iout-Vth(155)/R(153)] \tag{6}$$

Figure 2:
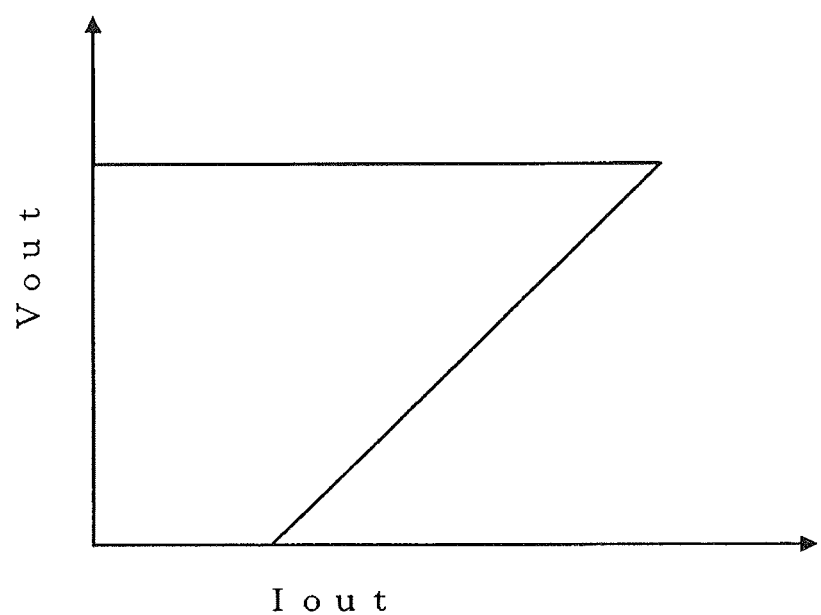
FIG. 2 is a graph showing an output voltage-output current characteristic of the voltage regulator according to the first embodiment.
Figure 3:
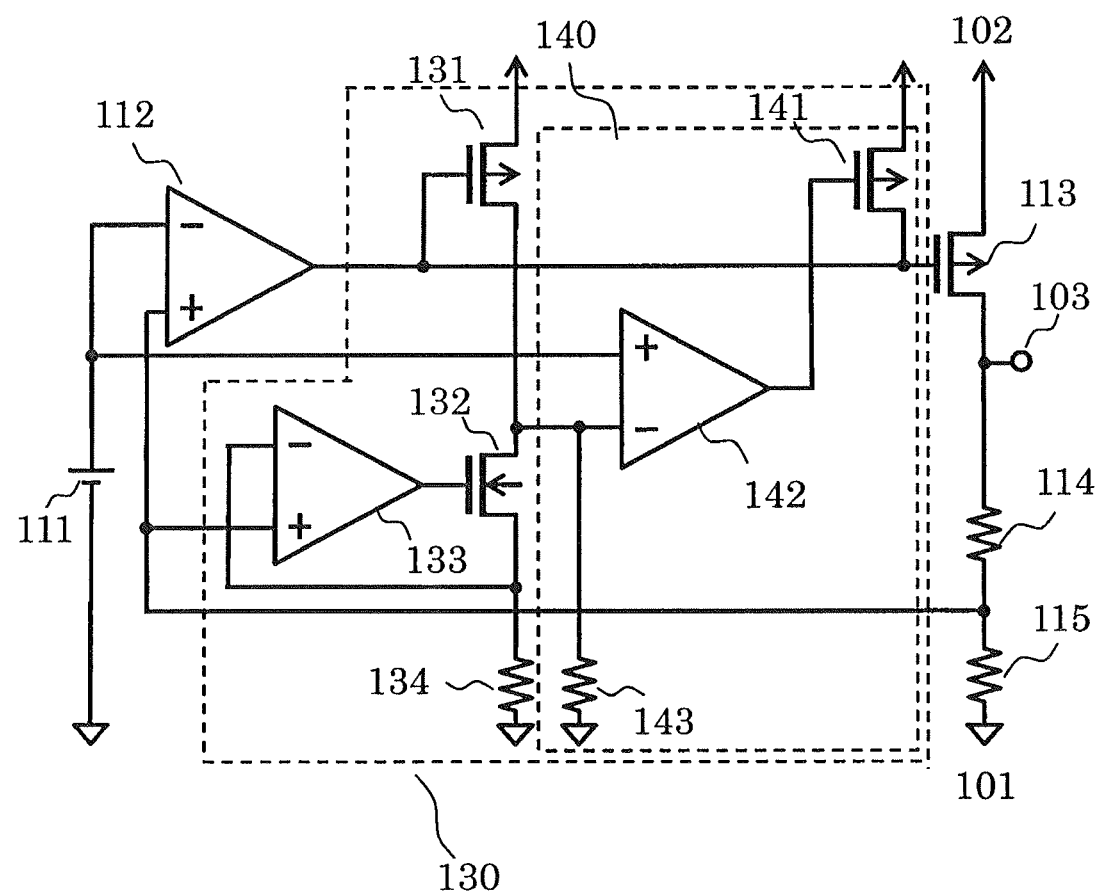
FIG. 3 is a circuit diagram illustrating a related-art voltage regulator.
Figure 4:
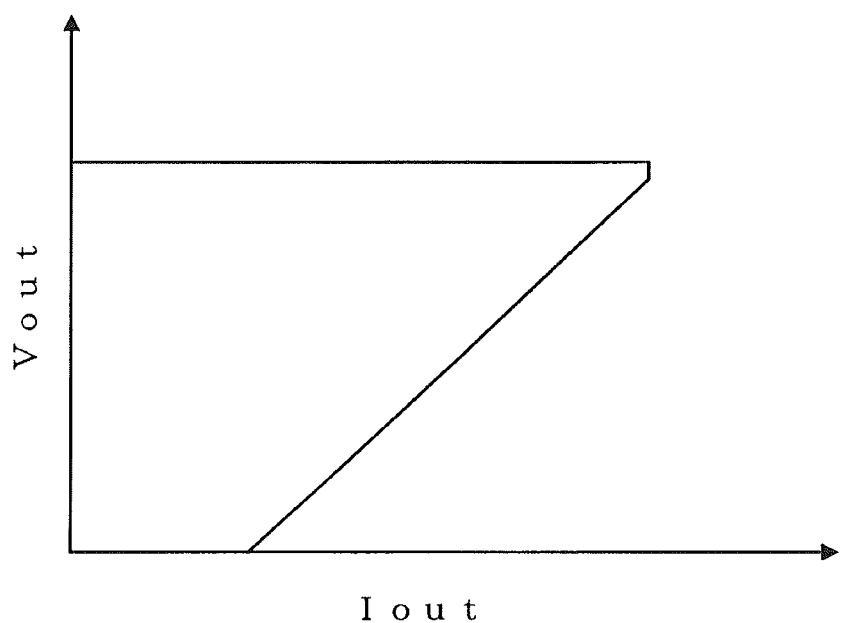
FIG. 4 is a graph showing an output voltage-output current characteristic of the related-art voltage regulator.

Therefore, the output voltage-output current characteristic exhibits an optimal fold-back characteristic. FIG. 2 shows the output voltage-output current characteristic of the voltage regulator according to the first embodiment.

As apparent from FIG. 2, when the overcurrent protection circuit 130 starts to work, there is no time period during which the output voltage Vout is dropped while the maximum output current Im flows. For this reason, the PMOS transistor 113 is not damaged.

Note that, the maximum output current Im with which the overcurrent protection circuit 130 starts to work is determined based on currents flowing through the PMOS transistor 131, the resistor 153, and the resistor 164, and hence the maximum output current Im can be set by adjusting the values of the resistor 153 and the resistor 164.

Figure 5:
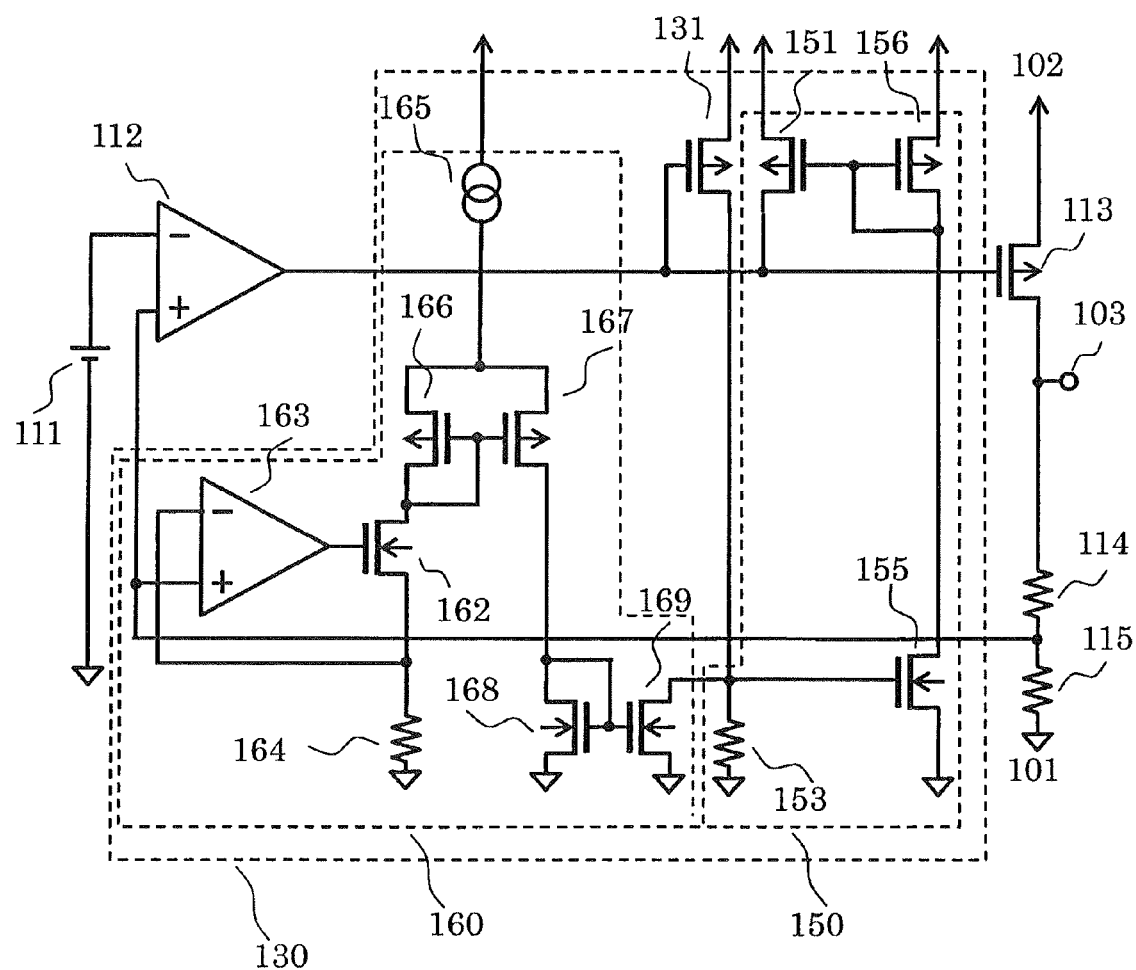
FIG. 5 is a circuit diagram illustrating another example of the voltage regulator according to the first embodiment.

FIG. 5 is a circuit diagram illustrating another example of the voltage regulator according to the first embodiment. FIG. 5 differs from FIG. 1 in that the resistor 154 is changed to a PMOS transistor 156.

The PMOS transistor 156 has a drain and a gate that are connected to the gate of the PMOS transistor 151 and the drain of the NMOS transistor 155, and a source connected to the power supply terminal 102. Other circuit configurations and connections are the same as those of FIG. 1.

Also with this configuration, the same effects as those of the voltage regulator of FIG. 1 can be obtained. In other words, the same effects can be obtained by any configuration as long as the resistor is an impedance element.

Second Embodiment

Figure 6:
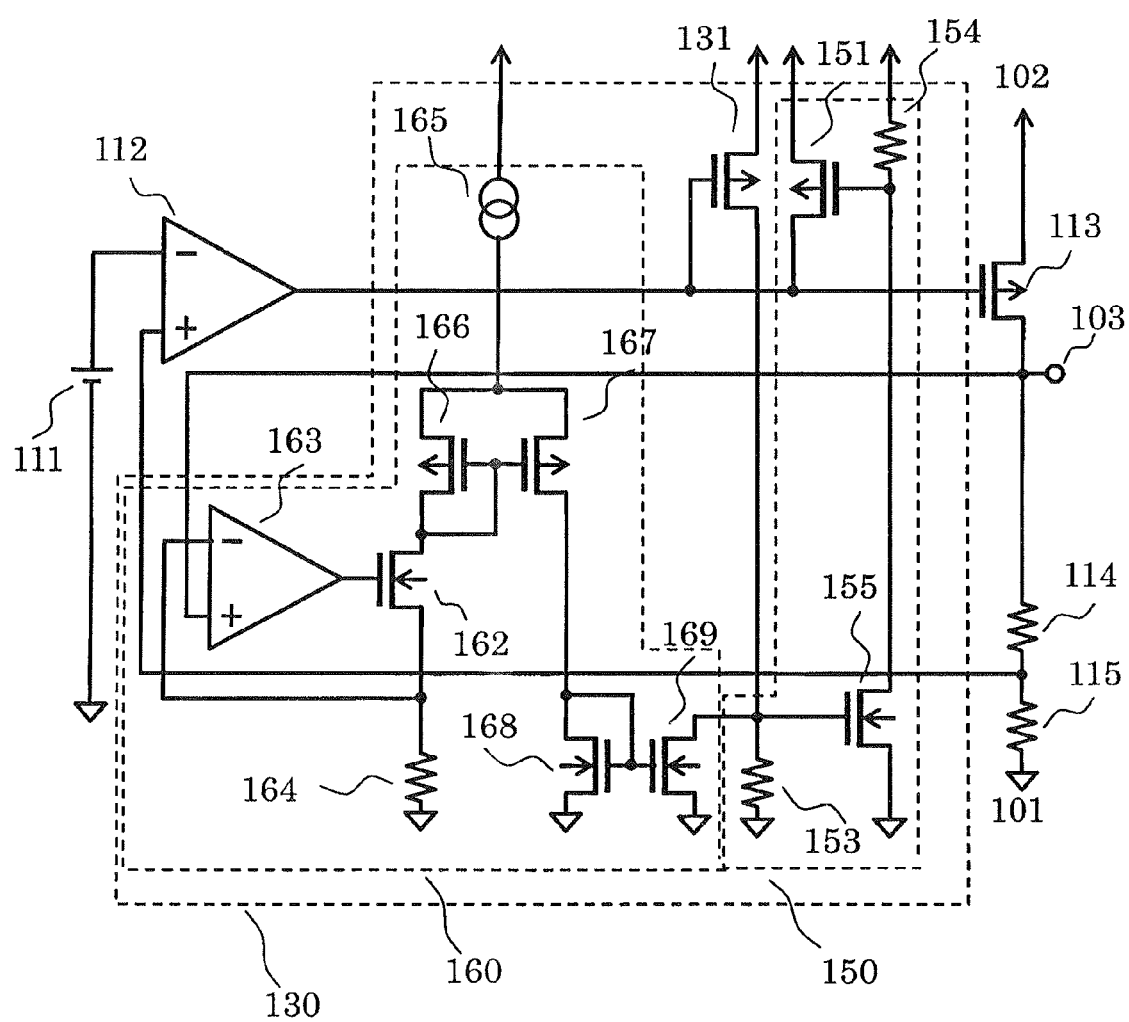
FIG. 6 is a circuit diagram illustrating a voltage regulator according to a second embodiment of the present invention.

FIG. 6 is a circuit diagram illustrating a voltage regulator according to a second embodiment of the present invention.

The second embodiment differs from the first embodiment in that the connection of the non-inverting input terminal of the differential amplifier circuit 163 is changed.

The non-inverting input terminal of the differential amplifier circuit 163 is connected to the output terminal 103. Other circuit configurations and connections are the same as those of the first embodiment.

Next, an operation of the voltage regulator according to the second embodiment is described.

The differential amplifier circuit 163 controls a voltage of the gate of the NMOS transistor 162 so that the source of the NMOS transistor 162 has a voltage equal to the output voltage Vout. A current proportional to the output voltage Vout flows through the resistor 164. This current is mirrored by the PMOS transistor 166, the PMOS transistor 167, the NMOS transistor 168, and the NMOS transistor 169.

A sense current in accordance with the output current Iout flowing through the output terminal 103 is caused to flow through the PMOS transistor 131. A current is caused to flow through the resistor 153, which is obtained by subtracting from the sense current flowing through the PMOS transistor 131 a current flowing through the NMOS transistor 169, namely, a current obtained by mirroring the current flowing through the resistor 164.

When the output terminal 103 and the ground terminal 101 are short-circuited, the output current Iout is increased. When an overcurrent state in which the output current Iout exceeds the maximum output current Im is established, the sense current flowing through the PMOS transistor 131 is increased to generate a voltage at the resistor 153. When the voltage of the resistor 153 is increased, the NMOS transistor 155 is turned on to cause a current to flow through the resistor 154, thereby turning on the PMOS transistor 151 gradually. In this way, the voltage of the gate of the PMOS transistor 113 gradually becomes the voltage of the power supply terminal 102 to turn off the PMOS transistor 113 gradually, thereby reducing the output current Iout.

When the PMOS transistor 113 is gradually turned off, the output voltage Vout is dropped. When the output voltage Vout is dropped, the voltage applied to one terminal of the resistor 164 is reduced and the current flowing through the resistor 164 is thus reduced. Along this, the current flowing through the NMOS transistor 169 is reduced and the current flowing through the resistor 153 is accordingly increased so that the gate of the PMOS transistor 113 is further turned off.

When the overcurrent protection circuit 130 operates, Expressions (1) to (3) and (7) are satisfied.

$$I(169)=I(164)=Vout/R(164) \tag{7}$$

where $Vth(x)$ represents a threshold of an NMOS transistor x, $R(x)$ represents a resistance value of a resistor x, $I(x)$ represents a current flowing through an element x, Mi represents a mirror ratio of the PMOS transistor 131 with respect to the PMOS transistor 113, Vout represents a voltage of the output terminal 103, and Iout represents a drain current of the PMOS transistor 113.

Based on Expressions (1) to (3) and (7), Expression (8) is satisfied between the output voltage Vout and the output current Iout.

$$Vout=R(164)/[Mi\times Iout-Vth(155)/R(153)] \tag{8}$$

Therefore, the output voltage-output current characteristic exhibits an optimal fold-back characteristic.

As described above, according to the voltage regulator of the present invention, when the overcurrent protection circuit 130 starts to work, there is no time period during which the output voltage Vout is dropped while the maximum output current Im flows. For this reason, the PMOS transistor 113 is not damaged and it is possible to provide the safe and secure voltage regulator.

What is claimed is:

1. A voltage regulator, comprising:
    a first differential amplifier circuit configured to control a gate of an output transistor in accordance with a difference between a reference voltage and a divided voltage obtained by dividing an output voltage output from the output transistor; and
    an overcurrent protection circuit configured to protect a circuit against an overcurrent of the output current of the output transistor,
    the overcurrent protection circuit comprising:
        a sense transistor including a gate connected to the gate of the output transistor, the sense transistor being configured to cause a sense current in accordance with the output current to flow;
        a first control circuit configured to generate a current proportional to the divided voltage; and
        a second control circuit configured to control the gate of the output transistor in accordance with the sense current and the current of the first control circuit, wherein the second control circuit comprises:
            a second resistor configured to cause a current to flow, the current being obtained by subtracting the current of the first control circuit from the sense current;
            a second NMOS transistor including a gate to be controlled by a voltage of the second resistor;
            an impedance element configured to receive a drain current of the second NMOS transistor; and
            a PMOS transistor including a gate to be controlled by a voltage of the impedance element.

2. A voltage regulator according to claim 1, wherein the first control circuit comprises:
    a second differential amplifier circuit configured to input the divided voltage;
    a first NMOS transistor configured to cause a drain current in accordance with an output of the second differential amplifier circuit to flow and to input the output voltage to the second differential amplifier;
    a first resistor configured to receive the drain current of the first NMOS transistor; and
    a current mirror circuit configured to mirror the drain current of the first NMOS transistor, to thereby cause the current of the first control circuit to flow.

3. A voltage regulator according to claim 1, wherein the first control circuit comprises:
    a second differential amplifier circuit configured to input the divided voltage and the output voltage;
    a first NMOS transistor configured to cause a drain current in accordance with an output of the second differential amplifier circuit to flow;
    a first resistor configured to receive the drain current of the first NMOS transistor; and
    a current mirror circuit configured to mirror the drain current of the first NMOS transistor, to thereby cause the current of the first control circuit to flow.

* * * * *